Patented June 26, 1934

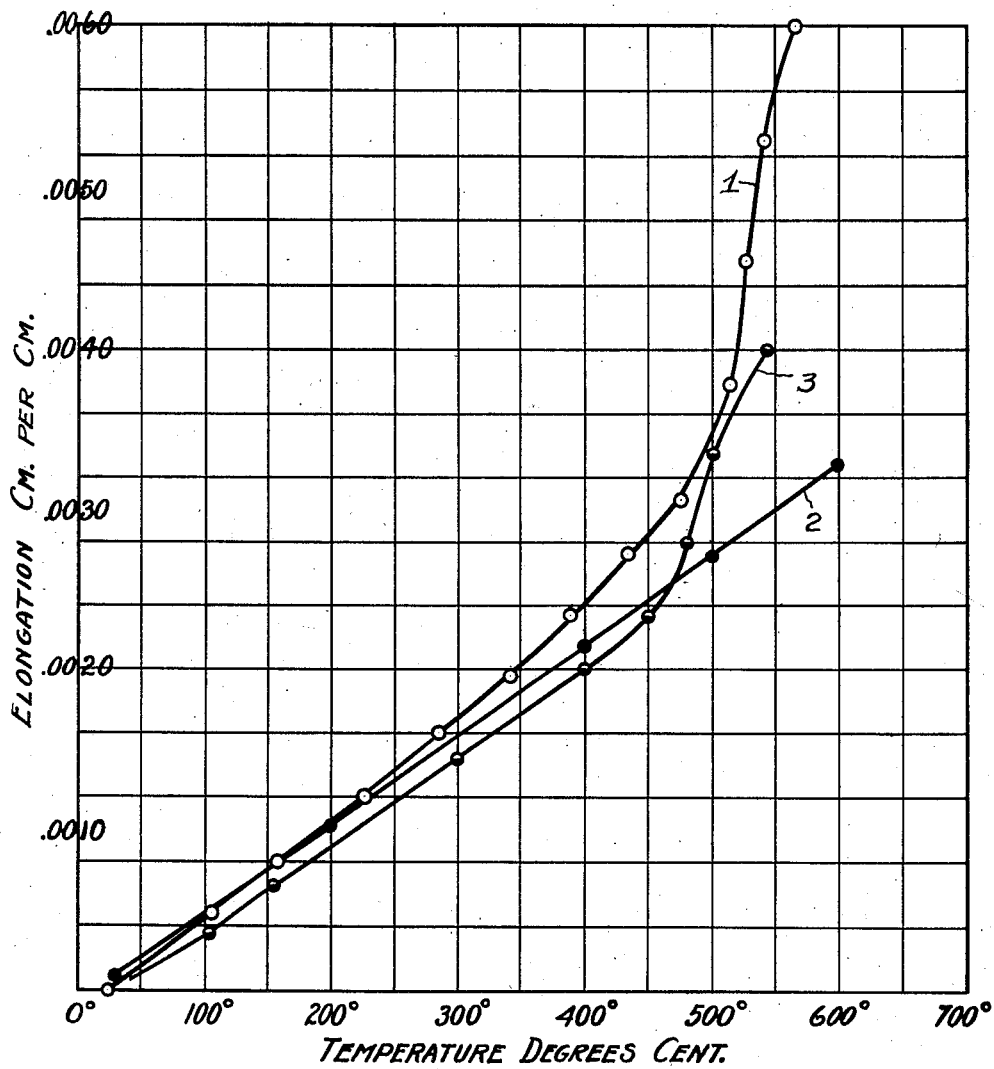

1,964,329

UNITED STATES PATENT OFFICE 1,964,329

GLASS-TO-METAL THERMAL JOINT

Martin E. Nordberg, Corning, N. Y., assignor to Corning Glass Works, Corning, N. Y., a corporation of New York Application November 17, 1932, Serial No. 643,122

3 Claims. (Cl. 49—81)

The theory of glass-to-metal thermal seals has been that both the glass and the metal should have the same coefficient of expansion for each degree up to the annealing range of the glass. An example of a seal embodying this theory is the seal between the lamp tubing glass known as #1 and platinum. As metals have, generally speaking, rather uniform expansion coefficients within this range of temperatures, this has necessitated uniform coefficients of expansion in the glass for each degree through the same range, and as many glasses which have the desired identity of expansion coefficient with the metal at low temperatures have an abrupt change in such coefficient at about the annealing range, the recognition of the above rule has caused many glasses, otherwise suitable as seals with desired metals, to be disregarded and thrown aside s useless.

I have discovered that identity of expansion per degree up to the annealing range of the glass, between the glass and the metal is not necessary and that satisfactory seals can be made with an otherwise suitable glass if the overall expansions of the metal and the glass between the lower range to which it is to be subjected (hereinafter called "static temperature") and the strain point of the glass are substantially the same, even though at intermediate temperatures the coefficients of expansion of the glass and of the metal are substantially different. "Strain point" as above used is the lower limit of the customary annealing range of the glass. This is illustrated by the attached figure in which I have plotted the overall expansion of tantalum (see curve 2) and two glasses (curves 1 and 3). It will be noted that between zero and 300° C. the curves of glass 1 and of tantalum practically coincide. Yet, a good seal cannot be made with such glass because, as shown, there is a wide departure between the curves 1 and 2 at the strain temperature of the particular glass, which strain temperature is about 530° C.

The glass whose curve is represented by 3 has at low temperature a smaller expansion coefficient than tantalum but its expansion coefficient starts to increase somewhat rapidly at about 450° C., with the result that its overall expansion from zero to its strain point (which is 473° C.) is substantially the same as that of tantalum throughout the same range. A good seal results with tantalum although at about 300° C. there is a substantial difference between the expansion coefficients of the two.

The discovery of this rule permits me to ascertain whether a glass is suitable for sealing to a given metal and indicates the thermal characteristics of a glass desirable in each case as an aid in determining the proper composition of such glass.

The glass whose expansion is indicated in curve 3 has the following composition:

|  | Per cent |
|---|---|
| $SiO_2$ | 67.2 |
| $Na_2O$ | 7.2 |
| $B_2O_3$ | 19.5 |
| $Sb_2O_3$ | 4.0 |
| $Al_2O_3$ | 1.3 |
| $As_2O_3$ | .8 |

What I claim is:

1. A glass-to-metal thermal joint in which the glass has an overall expansion between the static temperature of the joint and the strain point of the glass substantially the same as that of the metal between these temperatures and a coefficient of expansion substantially different from the metal at an intermediate temperature.

2. A glass-to-metal thermal seal in which the metal is tantalum, and the glass by analysis consists approximately of 67.2% $SiO_2$, 7.2% $Na_2O$, 19.5% $B_2O_3$, 4.0% $Sb_2O_3$, 1.3% $Al_2O_3$ and .8% $As_2O_3$.

3. A glass-to-metal thermal joint in which the metal is tantalum and the glass has an overall expansion between the static temperature of the joint and the strain point of the glass substantially the same as that of tantalum for the same range of temperatures and a thermal coefficient of expansion different from that of tantalum at intermediate temperatures.

MARTIN E. NORDBERG.